US011313321B2

(12) United States Patent
Todorovic

(10) Patent No.: US 11,313,321 B2
(45) Date of Patent: Apr. 26, 2022

(54) EXHAUST NOZZLE OF A GAS TURBINE ENGINE

(71) Applicant: Rolls-Royce Deutschland Ltd & Co KG, Blankenfelde-Mahlow (DE)

(72) Inventor: Predrag Todorovic, Berlin (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 263 days.

(21) Appl. No.: 16/718,991

(22) Filed: Dec. 18, 2019

(65) Prior Publication Data
US 2021/0189998 A1  Jun. 24, 2021

(51) Int. Cl.
*F02K 1/08* (2006.01)

(52) U.S. Cl.
CPC .......... *F02K 1/08* (2013.01); *F05D 2240/128* (2013.01); *F05D 2260/941* (2013.01)

(58) Field of Classification Search
CPC ........ F02K 1/08; F02K 1/04; F05D 2240/128; F05D 2260/941; F05D 2250/41
See application file for complete search history.

(56) References Cited

U.S. PATENT DOCUMENTS

2015/0345395 A1* 12/2015 Moore .................... F02K 1/383
                                                            60/806
2016/0326896 A1* 11/2016 Jamison .................. F01D 9/042

FOREIGN PATENT DOCUMENTS

DE      102017130563 A1     6/2019

* cited by examiner

*Primary Examiner* — Jacob M Amick
*Assistant Examiner* — Charles J Brauch
(74) *Attorney, Agent, or Firm* — Shuttleworth & Ingersoll, PLC; Timothy Klima

(57) ABSTRACT

Aspects of the disclosure regard an exhaust nozzle for a gas turbine engine that includes an outer nozzle wall, a flow channel which is limited radially outwards by the nozzle wall, a centerbody arranged in the flow channel, and at least two struts connecting the centerbody to the nozzle wall. One of the struts is connected to the nozzle wall by a first connection, the first connection constraining movement of the strut relative to the nozzle wall in the radial direction and in the circumferential direction. The at least one other strut is connected to the nozzle wall by a second connection, the second connection constraining movement of the strut relative to the nozzle wall in the circumferential direction but allowing movement of the strut relative to the nozzle wall in the radial direction.

14 Claims, 5 Drawing Sheets

EXHAUST NOZZLE OF A GAS TURBINE ENGINE

The present disclosure relates to an exhaust nozzle of a gas turbine engine.

It is known to provide for a variable area exhaust nozzle that comprises an outer nozzle wall and a centerbody that is displaceable in the axial direction relative to the outer nozzle wall. Document DE 10 2017 130 563 A1 describes an exhaust nozzle of a turbofan engine that comprises a centerbody which is connected by means of struts to an outer nozzle wall. To move the centerbody in the axial direction, the struts are axially displaceable relative to the nozzle wall.

In such arrangement, the centerbody and the struts are exposed both to the hot core airflow from the primary channel that has passed the core engine and to the colder bypass airflow from the bypass channel, whereas the outer nozzle wall is exposed mostly to the colder bypass airflow. This leads to a different thermal expansion of these components and, accordingly, to thermal stresses acting on these components.

There is thus a need to provide for a variable area exhaust nozzle of a gas turbine engine that avoids the generation of thermal stresses that act on the outer nozzle wall.

According to an aspect of the invention, an exhaust nozzle for a gas turbine engine is provided, wherein the exhaust nozzle comprises an outer nozzle wall, a flow channel which is limited radially outwards by the nozzle wall, a centerbody arranged in the flow channel, and at least two struts connecting the centerbody to the nozzle wall. One of the struts is connected to the nozzle wall by a first connection, the first connection constraining movement of the strut relative to the nozzle wall in the radial direction and in the circumferential direction. The at least one other strut is connected to the nozzle wall by a second connection, the second connection constraining movement of the strut relative to the nozzle wall in the circumferential direction but allowing movement of the strut relative to the nozzle wall in the radial direction. Typically, both the first connection and the second connection are form-fit connections.

Aspects of the invention are thus based on the idea to allow for a sliding movement of at least one of the struts relative to the nozzle wall in the radial direction, such radial movement allowing to compensate for a different thermal expansion of the struts and centerbody compared to the thermal expansion of the nozzle wall. At the same time, movement of the struts relative to the nozzle wall in the circumferential direction is hindered.

According to an embodiment, both the first connection and the second connection are further configured to allow movement of the strut relative to the nozzle wall in the axial direction of the nozzle. Accordingly, the first connection has one degree of freedom, allowing the respective strut to move relative to the outer nozzle wall in the axial direction. The second connection has two degrees of freedom, allowing the respective strut to move relative to the outer nozzle wall both in the radial direction and in the axial direction. This embodiment is of particular interest if the centerbody is displaceable relative to the outer nozzle wall, wherein the outer nozzle wall is fixed.

In an embodiment, the first connection is formed by a first sliding element and a first receiving slot, wherein the first sliding element extends radially from the radial outer end of the strut. It further extends in the axial direction, thereby forming an elongated lip or rail. The first receiving slot extends in the axial direction in the nozzle wall such that the first sliding element and the first receiving slot allow to displace the strut relative to the nozzle wall in the axial direction. It is further provided that the first sliding element is form-fitted in the radial and circumferential directions to the first receiving slot. Accordingly, the first sliding element is formed and arranged such in the first receiving slot that it cannot be displaced in the radial and circumferential directions.

The first sliding element and the first receiving slot may comprise, in cross section, corresponding keyhole shapes that provide for the form-fit in the radial and circumferential directions (wherein the cross-section of the keyhole shape of the sliding element is smaller than the cross-section of the keyhole shape of first receiving slot). For example, the first sliding element and the first receiving slot may both comprise a circular cross-section. In another example, the first sliding element and the first receiving slot may form a dovetail-connection.

In an embodiment, the second connection is formed by a second sliding element and a second receiving slot, wherein the second sliding element extends radially from the radial outer end of the strut. It also extends in the axial direction. The second receiving slot also extends in the axial direction such that the second sliding element and the second receiving slot allow to displace the strut relative to the nozzle wall in the axial direction. It is further provided that the second sliding element is form-fitted only in the circumferential direction to the second receiving slot. Accordingly, the second sliding element is formed and arranged such in the second receiving slot that it cannot be displaced in the circumferential directions but can be displaced in the radial direction.

For example, the second sliding element is formed as a flat rectangular element and the second receiving slot is formed as a slot with rectangular cross-section. Thereby, radial relative movement between the second sliding element and the second receiving slot can be realized. It is pointed out that the second sliding element does not necessarily have a strictly rectangular form but may have a decreasing diameter in the radial direction. Accordingly, more generally, the second sliding element may be a blade and the second receiving element may be a blade slot.

In an embodiment, the second receiving slot has a radial length that is larger than the maximum radial expansion of the struts and of the centerbody between a cold condition and temperatures reached during operation of the gas turbine engine. Thereby, radial expansion of the struts and of the centerbody can take place without thermal stresses acting between the nozzle wall and the struts.

In another embodiment, both the first connection and the second connection are further configured to constrain movement of the strut relative to the nozzle wall also in the axial direction of the nozzle. Accordingly, the first connection has no degree of freedom, fixing the strut in the radial, circumferential and axial directions to the outer nozzle wall. The second connection has one degree of freedom, allowing the respective strut to move relative to the outer nozzle wall in the radial direction only. This embodiment is of particular interest if the centerbody is fixed to the outer nozzle wall, without the possibility to move the centerbody relative to the outer nozzle wall. The outer nozzle wall may be fixed or may comprise a translatable structure to which the struts are connected.

In an embodiment, the first connection is formed by a first element and a first opening, wherein the first element extends radially from the radial outer end of the strut, the first opening is formed in the nozzle wall, and the first element is form-fitted in the radial, circumferential and axial directions to the first opening. Accordingly, the first element is formed and arranged such in the first opening that it cannot be displaced in any direction.

For example, the first element and the first opening have corresponding shapes. For example, the first element and the first opening may both have the form of a sphere.

In an embodiment, the second connection is formed by a second element and a second opening, wherein the second element extends radially from the radial outer end of the strut, the second opening is formed in the nozzle wall, and the second element is form-fitted to the second receiving opening in the circumferential and axial directions only. Accordingly, the second element is formed and arranged such in the second opening that it can be displaced in the radial direction only.

For example, the second element is formed as a pin and the second opening is formed as a blind hole.

In an embodiment, the nozzle comprises exactly two struts, one strut being connected to the nozzle wall by the first connection and the other strut being connected to the nozzle wall by the second connection. The two struts may be arranged approximately in a plane. In such case, such plane defines a lateral direction, wherein the radial direction is identical to the lateral direction.

In case of exactly two struts, the first connection may be realized in an inboard area of the nozzle located adjacent an aircraft fuselage that carries the gas turbine engine which implements the exhaust nozzle and the second connection may be realized at an outboard area of the nozzle located remote to the aircraft fuselage.

The outer nozzle wall may be fixed. The centerbody may be fixed to the fixed outer nozzle wall or may be movable relative to the fixed outer nozzle wall.

The exhaust nozzle may be a convergent-divergent nozzle, wherein the cross-section of the nozzle first decreases in the downstream direction towards a nozzle throat area (usually referred to as A8) and subsequently increases until it reaches the nozzle exit area (usually referred to as A9). By translating the centerbody relative to the outer nozzle wall, the degree of expansion of the flow channel behind the nozzle throat area, i.e. the ratio of A9 to A8, can be adjusted.

According to an embodiment, the nozzle is the nozzle of a supersonic gas turbine engine which is designed for operating conditions in the subsonic, transonic and supersonic ranges.

According to a further aspect of the invention, an exhaust nozzle for a gas turbine engine is provided which comprises: an outer nozzle wall, a flow channel which is limited radially outwards by the nozzle wall, a centerbody arranged in the flow channel, and at least two struts connecting the centerbody to the nozzle wall. It is provided that the struts are each connected to the nozzle wall by a connection that constrains movement of the strut relative to the nozzle wall in the circumferential direction but allows movement of the strut relative to the nozzle wall in the radial direction.

This aspect of the invention is based on the idea to allow for a sliding movement of all struts relative to the nozzle wall in the radial direction, such radial movement allowing to compensate for a different thermal expansion of the struts and centerbody compared to the thermal expansion of the nozzle wall. The embodiments discussed above similarly apply to this aspect of the invention.

In particular, the connection may be further configured to allow movement of the strut relative to the nozzle wall also in the axial direction of the nozzle.

In an embodiment, the connection is formed by a sliding element and a receiving slot, wherein the sliding element extends radially from the radial outer end of the strut and further in the axial direction. The receiving slot extends in the axial direction in the nozzle wall, wherein the sliding element is form-fitted only in the circumferential direction to the second receiving slot. It is further provided that the sliding element is formed as a flat rectangular element and that the receiving slot is formed as a slot with rectangular cross-section.

It should be noted that the present invention is described in terms of a cylindrical coordinate system having the coordinates x, r and φ. Here x indicates the axial direction, r the radial direction and φ the angle in the circumferential direction. The axial direction is defined by the machine axis/engine centerline of the gas turbine engine, with the axial direction pointing from the engine inlet to the engine outlet. The axial direction of the gas turbine engine is at least substantially identical with the axial direction of the exhaust nozzle of the gas turbine engine. Starting from the x-axis, the radial direction points radially outwards. Terms such as "in front of" and "behind" refer to the axial direction or flow direction in the engine. Terms such as "outer" or "inner" refer to the radial direction.

The invention will be explained in more detail on the basis of exemplary embodiments with reference to the accompanying drawings in which.

Figure 3:
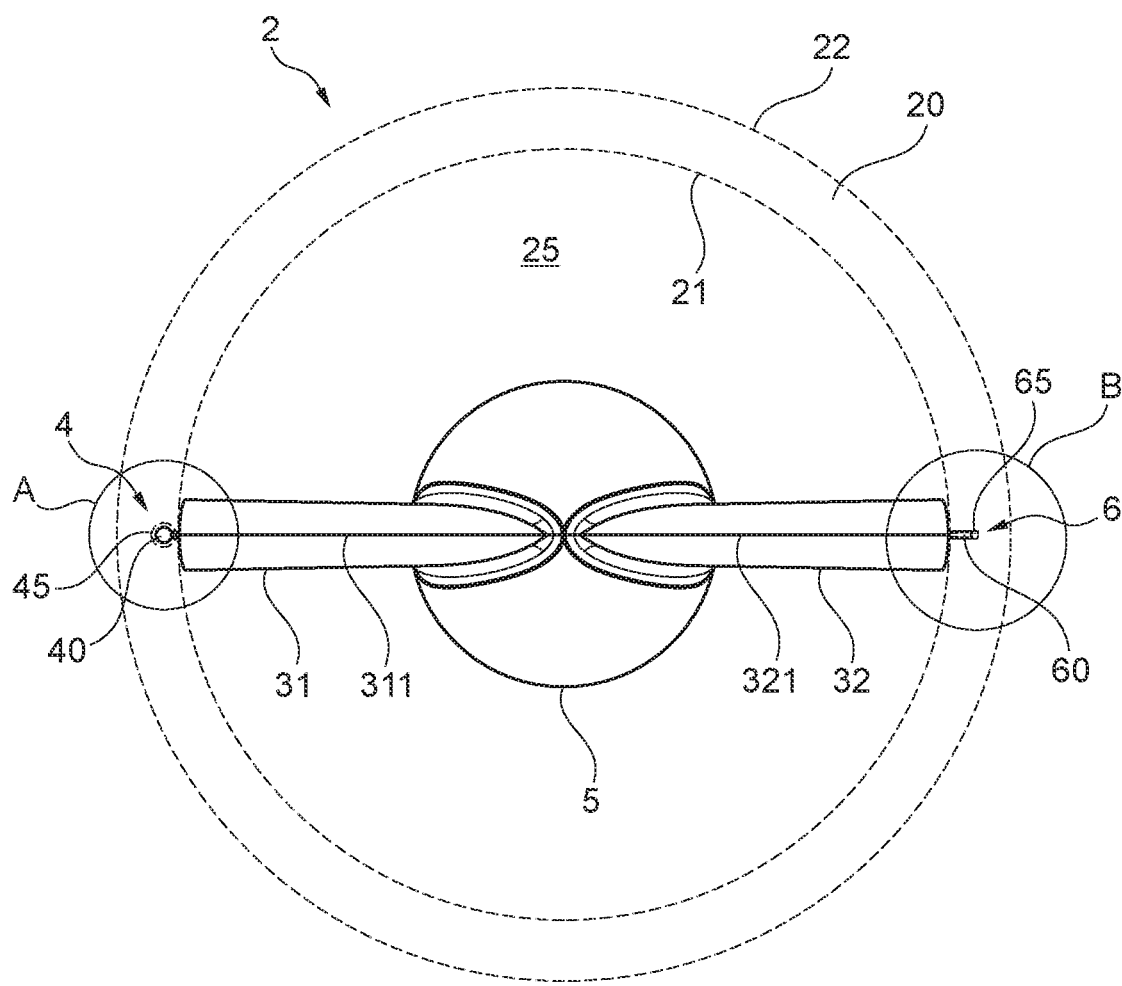
FIG. 3 is a partly sectional front view of an embodiment of an exhaust nozzle that comprises a centerbody that is connected via two struts to an outer nozzle wall, wherein different connections are implemented to connect the struts with the outer nozzle wall.
Figure 4:
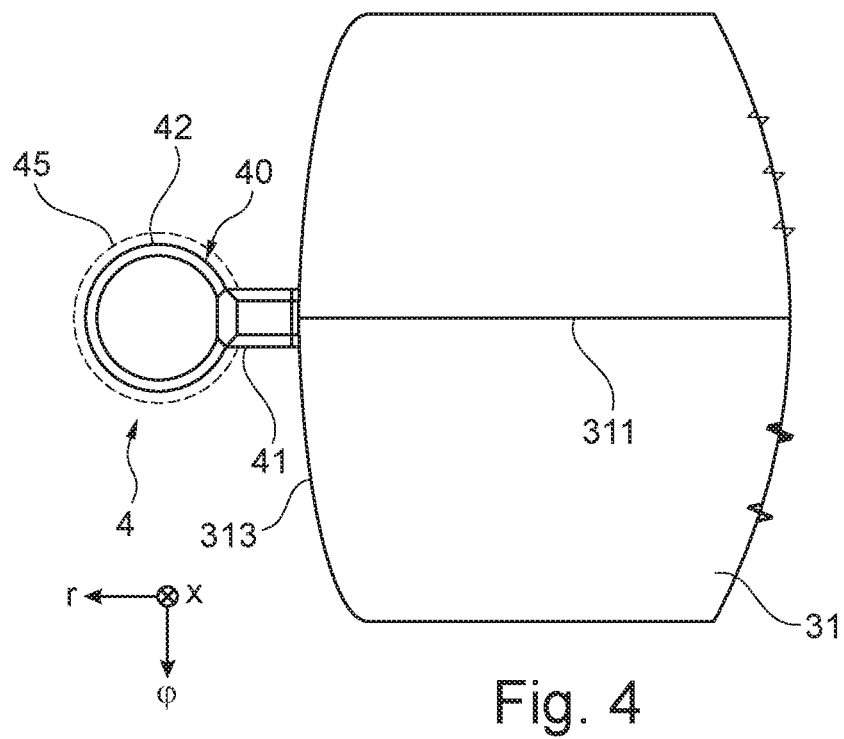
Figure 5:
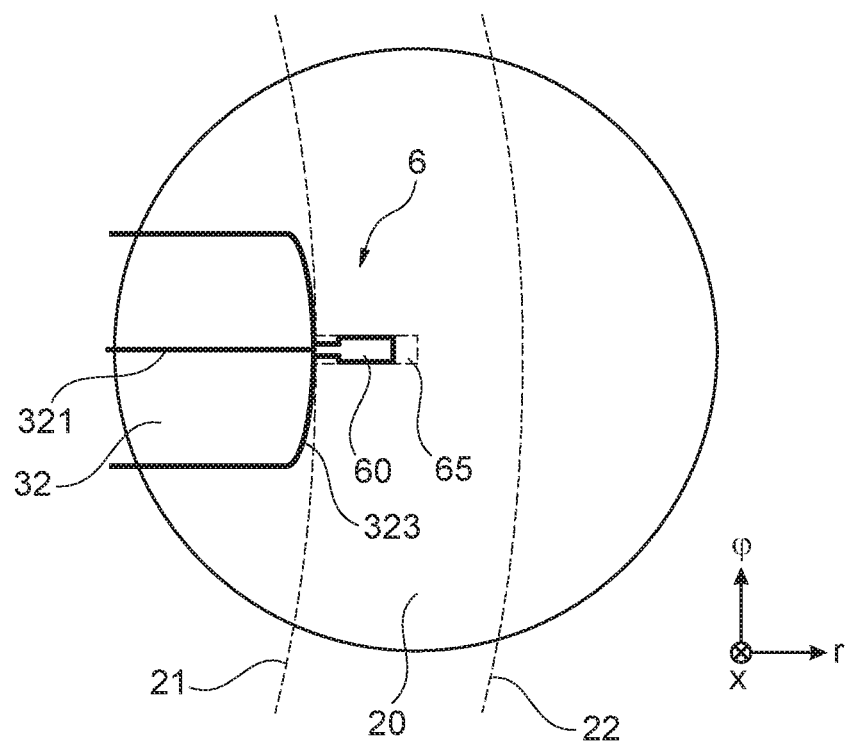
Figure 6:
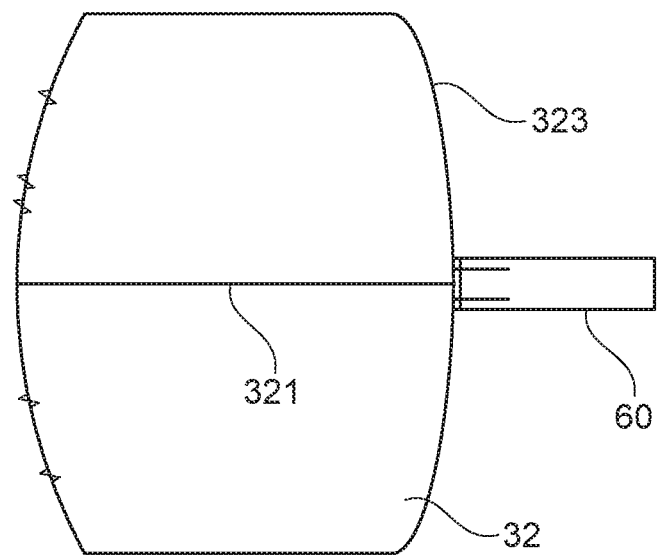

FIG. 4 an enlarged view of area A of FIG. 3 depicting a first connection between a strut and the outer nozzle wall, the first connection constraining a relative movement between the strut and the outer nozzle in the radial direction;

FIG. 5 an enlarged view of area B of FIG. 3 depicting a second connection between a strut and the outer nozzle wall, the second connection enabling a relative movement between the strut and the outer nozzle in the radial direction;

FIG. 6 a still further enlarged view of area B of FIG. 3; and

Figure 7:
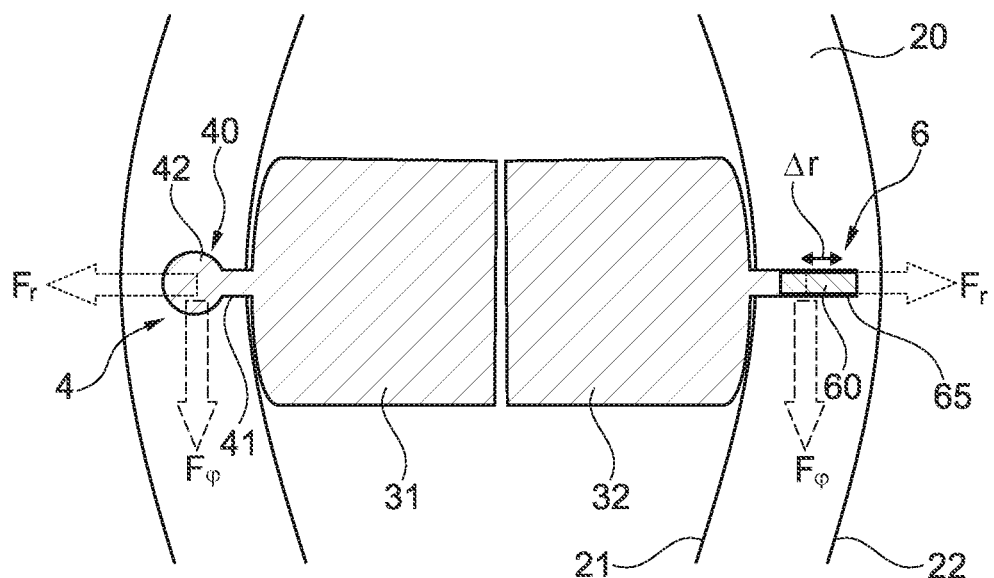

FIG. 7 a schematic front view of an exhaust nozzle in accordance with FIG. 3, wherein the acting forces are schematically indicated.

Figure 1:
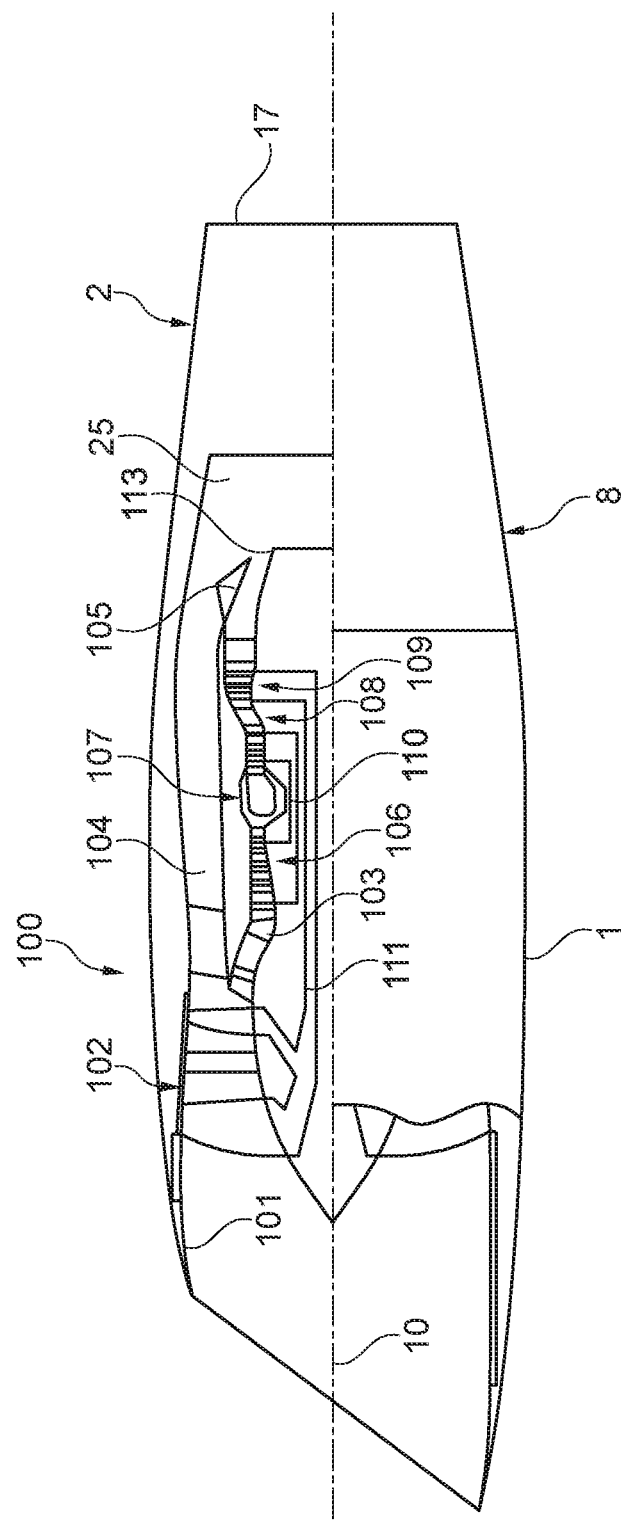
FIG. 1 is a schematic sectional side view of a supersonic gas turbine engine.

FIG. 1 shows a turbofan engine which is intended and suitable for use in a civil or military supersonic aircraft and, accordingly, is designed for operating conditions in the subsonic, transonic and supersonic ranges. However, it should be noted that the principles of this invention can also be implemented in a turbofan engine designed for subsonic operation only. The description of the invention in the context of an engine intended for a supersonic aircraft is therefore only to be understood as an example.

The turbofan engine 100 comprises an engine intake 101, a fan 102 which may be a multi-stage fan, a primary flow channel 103 which passes through a core engine, a secondary flow channel 104 which bypasses the core engine, a mixer 105 and a nozzle 2 in which a thrust reverser 8 can be integrated.

The turbofan engine 100 has a machine axis or engine centerline 10. The machine axis 10 defines an axial direction of the turbofan engine. A radial direction of the turbofan engine is perpendicular to the axial direction.

The core engine comprises a compressor 106, a combustion chamber 107 and a turbine 108, 109. In the example shown, the compressor comprises a high-pressure compressor 106. A low-pressure compressor is formed by the areas close to the hub of the fan 102. The turbine behind the combustion chamber 107 comprises a high-pressure turbine 108 and a low-pressure turbine 109. The high-pressure turbine 108 drives a high-pressure shaft 110 which connects the high-pressure turbine 108 with the high-pressure compressor 106. The low-pressure turbine 109 drives a low-pressure shaft 111 which connects the low-pressure turbine 109 with the multi-stage fan 102. According to an alternative design, the turbofan engine may also have a medium-pressure compressor, a medium-pressure turbine and a medium-pressure shaft. Furthermore, in an alternative design it can be provided that the fan 102 is coupled to the low-pressure shaft 111 via a reduction gearbox, e.g., a planetary gearbox.

The turbofan engine is arranged in an engine nacelle 1. The engine nacelle 1 may be connected to the aircraft fuselage via a pylon.

The engine intake 101 forms a supersonic air intake and is, therefore, designed and suitable for decelerating the incoming air to velocities below Ma 1.0 (Ma=Mach number). The engine inlet is beveled in FIG. 1, with the lower edge protruding from the upper edge, but other kinds of supersonic intakes may be implemented instead.

The flow channel through the fan 102 is divided behind the fan 102 into the primary flow channel 103 and the secondary flow channel 104. The secondary flow channel 104 is also referred to as the bypass channel.

Behind the core engine, the primary flow in the primary flow channel 103 and the secondary flow in the secondary flow channel 104 are mixed by the mixer 105. Furthermore, an outlet cone 113 is mounted behind the turbine in order to achieve desired cross-sections of the flow channel.

The rear area of the turbofan engine is formed by an integral nozzle 2, where the primary and secondary flows are mixed in the mixer 105 before being fed into the integral nozzle 2. The engine behind mixer 105 forms a flow channel 25, which extends through nozzle 2. Alternatively, separate nozzles can be provided for the primary flow channel 103 and the secondary flow channel 104 meaning that the flow through the secondary flow channel 104 has its own nozzle that is separate to and radially outside the core engine nozzle. One or both nozzles (whether mixed or split flow) may have a fixed or variable area.

Figure 2:
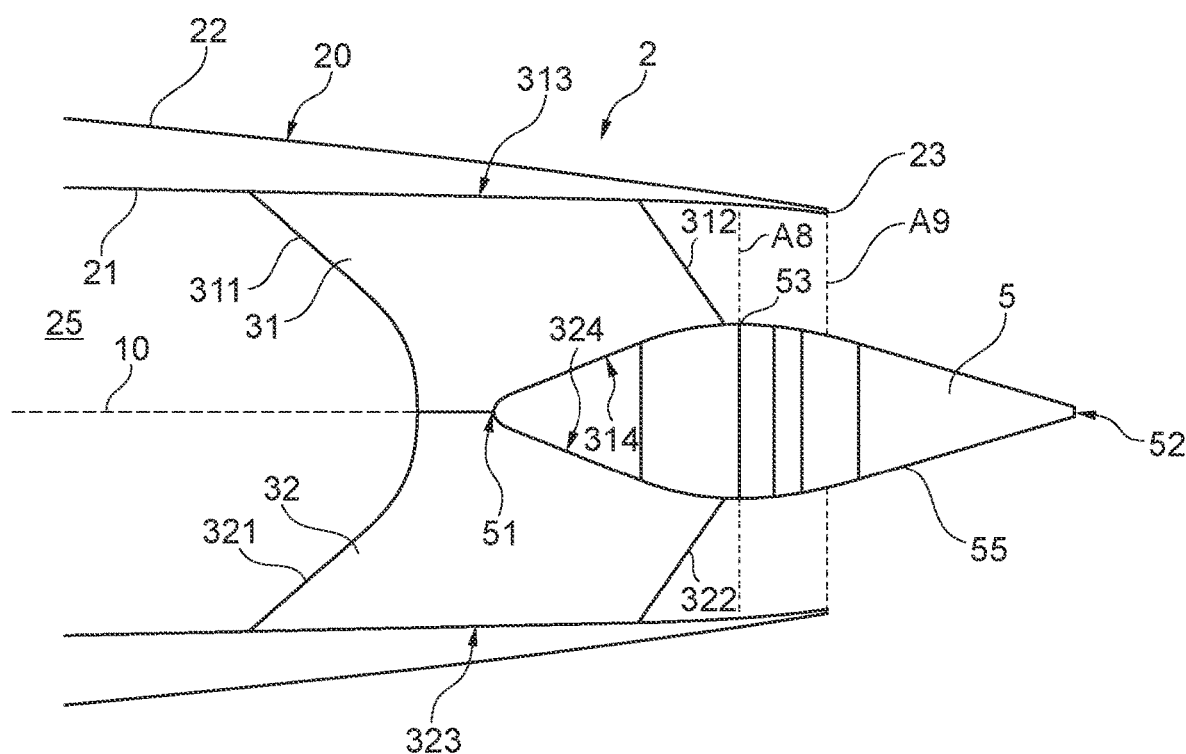
FIG. 2 is a sectional view of an example of an exhaust nozzle that comprises a centerbody that is connected via two struts to an outer nozzle wall.

In the context of this invention, the design of the nozzle 2 is of relevance. FIG. 2 shows schematically the basic design of the nozzle 2 in a sectional view that contains the engine centerline 10. Nozzle 2 comprises an outer nozzle wall 20 formed by an inner wall 21 and an outer wall 22. The inner wall 21 forms the radially outer boundary of a flow channel 25 through the nozzle 2. The outer wall 22 is formed radially outside to the inner wall 21 and adjoins the surroundings. The inner wall 21 and the outer wall 22 may converge at a point downstream to form a nozzle exit edge 23 at their downstream end.

The nozzle 2 also includes a centerbody 5, which forms a surface 55. The centerbody 5 has a longitudinal axis identical to the engine centerline 10. The centerbody 5 forms an upstream end 51, a downstream end 52 and a maximum 53 of its cross-sectional area between the upstream end 51 and the downstream end 52. In the example shown, but not necessarily, the centerbody 5 is conical adjacent to its upstream end 51 and towards its downstream end 52.

The nozzle 2 forms a nozzle throat area A8 where the cross-sectional area between centerbody 5 and inner wall 21 is minimum. Typically, the axial position of the nozzle throat area A8 is defined by the axial position of the maximum 53 of the centerbody 5. However, this is not necessarily the case. At the nozzle exit edge 23, the thrust nozzle forms a nozzle exit area A9. This area is equal to the difference between the cross-sectional area formed by the inner wall 21 at the nozzle exit edge 23 and the cross-sectional area of the centerbody 5 in the plane under consideration. The ratio A9 to A8 defines the degree of expansion of the flow channel 25 behind the nozzle throat area A8.

The nozzle 2 further comprises two struts 31, 32 connecting the centerbody 5 to the nozzle wall 20, namely, the inner wall 21. They extend from the centerbody 5 in a radial direction through the flow channel 25 to the nozzle wall 20. The struts 31, 32 each have a profile with a front edge 311, 321 and a rear edge 312, 322, as well as an upper side and a lower side. Each strut 31, 32 has a radially outer end 313, 323 at which it is connected to the inner wall 21 and a radially inner end 314, 324 at which it is connected to the centerbody 5.

The struts 31, 32, which may also be referred to as wings, are approximately arranged in a plane containing the engine centerline 10. An arrangement of the struts "approximately" in a plane exists insofar as the struts have a three-dimensional extension corresponding to the profile they form. Furthermore, in embodiments, it may be provided that the two struts 31, 32 are arranged at an angle to each other.

The centerbody 5 is fixed to the struts 31, 32. In one embodiment, the struts 31, 32 are fixed to the outer nozzle wall 20 so that the centerbody 5 cannot be displaced axially relative to the outer nozzle wall 20. In an alternative design, the struts 31, 32 can be displaced relative to the outer nozzle wall 20. In such case, actuators are provided that interact with the struts 31, 32 to provide for an axial movement of the struts. For example, such actuators may comprise a worm screw that interacts with a toothing formed in a rack of the respective strut (so called worm and rack drive).

The centerbody may be a modulated centerbody, the cross-section of which varies along the axial direction, wherein the cross-section may have one or several maxima.

With both struts 31, 32 being connected to the outer nozzle wall 20, thermal expansion of the struts 31, 32 and of the centerbody 5 leads to thermal stresses between the struts 31, 32 and the outer nozzle wall 20.

FIGS. 3 to 6 discuss embodiments in which the struts 31, 32 are connected to the outer nozzle wall 20 in a manner that allows to compensate for thermal expansion of the centerbody 5 and struts 31, 32.

FIG. 3 shows in front view a centerbody 5, which is connected by means of two struts 31, 32 to an outer nozzle wall 20 which comprises an inner wall 21 and an outer wall 22, similar to the example discussed with respect to FIG. 2. The struts 31, 32 have respective front edges 311, 321.

The nozzle wall 20 has a circular cross-section. The centerbody 5 is located at the centerline of the nozzle 2, which is identical to the centerline of the gas turbine engine. A flow channel 25 through the nozzle to is limited radially outwards by the nozzle wall 20, namely, its inner wall 21.

The struts 31, 32 are connected by means of different connections 4, 6 to the nozzle wall 20. More particularly, strut 31 is connected to nozzle wall 20 by means of a first connection 4 that is shown in more detail in FIG. 4. Referring additionally to FIG. 4, the first connection 4 is formed by a first sliding element 40 and a first receiving slot 45 which both extend in the axial direction, wherein the first receiving slot 45 extends axially in the nozzle wall 20. The first sliding element 40 extends radially from the radially outer end 313 of the strut 31 in the height of the front edge 311. It comprises a bridge 41 directly connected to the radially outer end 313 of strut 31 and a cylindrical element 42, the form of which corresponds to the form of the first receiving slot 45 such that there is a form-fit between the first sliding element 40, namely, the cylindrical element 42, and the first receiving slot 45. Such form-fit connection constrains movement of the first sliding element 40 and thus of the strut 31 both in the radial direction r and in the circumferential direction φ. However, a relative movement in the axial direction x is enabled.

The corresponding forms of the first sliding element 40 and of the first receiving slot 45 shown in FIGS. 3 and 4 are to be understand as an example only. Other corresponding forms which allow for an axial movement while hindering a radial and circumferential movement may be implemented instead. Generally, the first sliding element 40 and the first receiving slot 45 may comprise corresponding key-hole sliding profiles.

The other strut 32 is connected to nozzle wall 20 by means of a second connection 6 that is shown in more detail in FIGS. 5 and 6. Referring additionally to FIGS. 5 and 6, the second connection 6 is formed by a second sliding element 60 and a second receiving slot 65 which both extend in the axial direction, wherein the second receiving slot 60 extends axially in the nozzle wall 20. The second sliding element 60 extend radially from the radially outer end 323 of strut 32. It is formed as a blade, having a rectangular cross-section. The second receiving slot 65 is formed as a blade slot, having also a rectangular cross-section.

Depending on the temperature and thermal expansion of the struts 31, 32 and of the centerbody 5, the second sliding element 60 can move in and against the radial direction within the second receiving slot 65. Accordingly, while one strut 31 is constrained in the radial direction, the other strut 32 does not experience any radial constraint and is free to expand in the radial direction, thereby avoiding the buildup of thermal stresses between the struts 31, 32 and the nozzle wall 20.

The circumferential constraint that is present at both connections 4, 6 is almost indifferent thermal expansion.

The radial length of the receiving slot 65 is designed such that sufficient radial expansion Δr of the struts 31, 32 and of the centerbody 5 is possible. In this respect, in one embodiment the struts have been sized and designed in cold condition such that, when heated up by hot airflow during operation, the struts expand to the ideal annulus lines under steady-state temperatures. The ideal annulus line is such that the radial outer ends 313, 323 of struts 31, 32 rest adjacent the inner wall 21 of the nozzle wall 20, without exercising a stress on the nozzle wall. At the same time, the blade 60 which represents the second sliding element is moved to a maximum Δr in the radial direction into the blade slot 65. Accordingly, the design of the struts is such that a natural thermal growth in hot conditions is enabled without transmitting excessive thermally induced loads.

The length of the blade slot 65 depends on the coefficient of thermal expansion of the material used for the struts and for the centerbody. When using metal components, the radial expansion Δr from the cold state condition to a high steady-state temperatures may be in the range between 5 mm and 10 mm. Accordingly, in embodiments, the radial length of the receiving slot may be in the range between 8 and 20 mm.

As discussed, the two struts 31, 32 may be arranged approximately in a plane, such that the two connections 4, 6 are approximately located at opposite sides of the nozzle wall. If the gas turbine engine which comprises the nozzle is attached to the fuselage of an airplane, it may be provided that the first connection 4 is located at the inboard side and that the second connection 6 is located at the outboard side of the nozzle.

FIG. 7 shows in a schematic manner the two different connections 4, 6 of the first strut 31 and the second strut 32. The depiction is similar to that of FIG. 3, wherein the connections 4, 6 have been exaggerated, and wherein radial forces $F_r$ and circumferential forces $F_\varphi$ that may apply are shown. The first connection 4 constraints both the radial forces $F_r$ and circumferential forces $F_\varphi$. The second connection 6 restraints only the circumferential forces Fφ, but allows movement of the blade 60 in the blade slot 65 in the radial direction in response to a radial force $F_r$ caused by thermal expansion, wherein a maximum radial displacement Δr can be realized within the blade slot 65, the amount of which depends on the properties of the used materials and the temperature difference.

In an alternative embodiment, the centerbody 5 is not displaceable axially relative to the nozzle wall 20. In such case, the struts 31, 32 are connected to the nozzle wall 20 in a fixed manner without the ability to be displaced in the axial direction. FIG. 3 also shows an embodiment of such alternative, as in the depicted partly sectional front view of FIG. 3 the difference between struts 31, 32 that comprise elongated siding elements and struts that contain pin-like connecting elements is not visible. In such embodiment, a first connection 4 is formed by a pin 40 arranged form-fitted in an opening 45 in the radial, circumferential and axial directions, wherein the pin 40 and the opening 45 have a corresponding form.

The second connection 6 is formed by a cylindrical pin 60 which can be displaced in the radial direction in a cylindrical blind hole 65 such that movement of the strut 32 relative to the nozzle wall 20 in the radial direction is allowed. However, movement in the circumferential and axial directions is hindered by the second connection 6.

In further alternative embodiments, both struts are connected to the nozzle wall 20 in a manner that allows movement of the struts relative to the nozzle wall 20 in the radial direction, as shown in FIGS. 5 to 6.

In further alternative embodiments, there are provided more than two struts, such as three, four or five struts, to connect the centerbody 5 to the nozzle wall 20. In such case, it can be provided that only one of the struts is connected to the nozzle wall in a manner that constrains movement of the strut both in the radial direction and in the circumferential direction, as shown in FIG. 4, whereas the other struts are connected to the nozzle wall in a manner that allows movement of the struts relative to the nozzle wall 20 in the radial direction, as shown in FIGS. 5 to 6.

It is pointed out that in all embodiments a thrust reverser unit can be integrated into the nozzle. In such case, the outer nozzle wall 20 is also a wall of the thrust reverser unit. In such case, the first and second receiving slots may be integrated into structural side beams of the nozzle that form part of the thrust reverser unit. Also, actuators for displacing the struts 31, 32 in the axial direction may be integrated into structural elements of the thrust reverser unit.

It should be understood that the above description is intended for illustrative purposes only and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. An exhaust nozzle of a gas turbine engine, wherein the exhaust nozzle comprises:
   an outer nozzle wall,
   a flow channel which is limited radially outwards by the outer nozzle wall,
   a centerbody arranged in the flow channel, and
   at least two struts, including a first strut and a second strut, connecting the centerbody to the outer nozzle wall,
   a first connection connecting the first strut to the outer nozzle wall, the first connection constraining movement of the first strut relative to the outer nozzle wall in a radial direction and in a circumferential direction,
   a second connection connecting the second strut to the outer nozzle wall, the second connection constraining movement of the second strut relative to the outer nozzle wall in the circumferential direction but allowing movement of the second strut relative to the outer nozzle wall in the radial direction;
   wherein both the first connection and the second connection are further configured to allow movement of the respective first and second struts relative to the outer nozzle wall in an axial direction of the exhaust nozzle.

2. The exhaust nozzle of claim 1, wherein the first connection is formed by a first sliding element and a first receiving slot, wherein:
   the first sliding element extends radially from a radially outer end of the first strut,
   the first sliding element extends in the axial direction,
   the first receiving slot extends in the axial direction in the outer nozzle wall, and
   the first sliding element is form-fitted in the radial and circumferential directions to the first receiving slot.

3. The exhaust nozzle of claim 2, wherein the first sliding element and the first receiving slot comprise, in cross-section, corresponding keyhole shapes.

4. The exhaust nozzle of claim 1, wherein the second connection is formed by a second sliding element and a second receiving slot, wherein
   the second sliding element extends radially from a radially outer end of the second strut,
   the second sliding element extends in the axial direction,
   the second receiving slot extends in the axial direction in the outer nozzle wall, and
   the second sliding element is form-fitted only in the circumferential direction to the second receiving slot.

5. The exhaust nozzle of claim 4, wherein the second sliding element is formed as a flat rectangular element and wherein the second receiving slot is formed as a slot with rectangular cross-section.

6. The exhaust nozzle of claim 4, wherein the second sliding element is formed as a blade, and wherein the second receiving slot is formed as a blade slot.

7. The exhaust nozzle of claim 4, wherein the second receiving slot has a radial length that is larger than a maximum radial expansion of the first and second struts and of the centerbody between a cold condition and temperatures reached during operation of the gas turbine engine.

8. The exhaust nozzle of claim 1, wherein the exhaust nozzle comprises exactly two struts, the first strut and the second strut.

9. The exhaust nozzle of claim 8, wherein the first connection is positioned in an inboard area of the exhaust nozzle located adjacent an aircraft fuselage and the second connection is realized at an outboard area of the exhaust nozzle located remote to the aircraft fuselage.

10. The exhaust nozzle of claim 8, wherein the first and second struts are arranged approximately in a plane.

11. The exhaust nozzle of claim 1, wherein the exhaust nozzle has a convergent-divergent cross-section.

12. The exhaust nozzle of claim 1, wherein the exhaust nozzle is configured as an exhaust nozzle of a supersonic gas turbine engine.

13. An exhaust nozzle for a gas turbine engine, wherein the exhaust nozzle comprises:
   an outer nozzle wall,
   a flow channel which is limited radially outwards by the outer nozzle wall,
   a centerbody arranged in the flow channel, and
   two struts connecting the centerbody to the outer nozzle wall,
   wherein the two struts are each connected to the outer nozzle wall by a connection that constrains movement of a respective one of the two struts relative to the outer nozzle wall in a circumferential direction but allows movement of the respective one of the two struts relative to the outer nozzle wall in a radial direction;
   wherein the connection is further configured to allow movement of the respective one of the two struts relative to the outer nozzle wall in an axial direction of the exhaust nozzle.

14. The exhaust nozzle of claim 13, wherein the connection is formed by a sliding element and a receiving slot, wherein
   the sliding element extends radially from a radially outer end of the respective one of the struts,
   the sliding element extends in the axial direction,
   the receiving slot extends in the axial direction in the outer nozzle wall, and
   the sliding element is form-fitted only in the circumferential direction to the receiving slot, wherein the sliding element is formed as a flat rectangular element, and wherein the receiving slot is formed as a slot with rectangular cross-section.

* * * * *